US012191066B2

(12) United States Patent
Chen et al.

(10) Patent No.: US 12,191,066 B2
(45) Date of Patent: Jan. 7, 2025

(54) COMPACT POWER INDUCTOR

(71) Applicant: Ford Global Technologies, LLC, Dearborn, MI (US)

(72) Inventors: Lihua Chen, Farmington Hills, MI (US); Baoming Ge, Okemos, MI (US); Fan Wang, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 745 days.

(21) Appl. No.: 17/145,064

(22) Filed: Jan. 8, 2021

(65) Prior Publication Data

US 2022/0223331 A1 Jul. 14, 2022

(51) Int. Cl.

| | |
|---|---|
| ***H01F 27/28*** | (2006.01) |
| ***H01F 27/02*** | (2006.01) |
| ***H01F 27/08*** | (2006.01) |
| ***H01F 27/24*** | (2006.01) |

(52) U.S. Cl.

CPC ........... *H01F 27/28* (2013.01); *H01F 27/022* (2013.01); *H01F 27/08* (2013.01); *H01F 27/24* (2013.01)

(58) Field of Classification Search

CPC ........ H01F 27/28; H01F 27/022; H01F 27/08; H01F 27/24; H01F 27/025; H01F 27/10; H01F 37/00; H01F 17/04; H01F 27/2876; H01F 27/306

See application file for complete search history.

(56) References Cited

U.S. PATENT DOCUMENTS

| | | | | |
|---|---|---|---|---|
| 3,144,627 | A * | 8/1964 | Dunnabeck | H01F 27/16 336/62 |
| 4,631,652 | A * | 12/1986 | Wendt | H01F 27/38 363/75 |
| 9,553,540 | B2 | 1/2017 | Degner et al. | |
| 9,581,234 | B2 | 2/2017 | Sung et al. | |
| 10,529,479 | B2 | 1/2020 | Skalski et al. | |
| 2012/0229986 | A1* | 9/2012 | Huda | H01F 27/366 336/83 |
| 2014/0132378 | A1 | 5/2014 | Vafakhah et al. | |
| 2014/0132382 | A1* | 5/2014 | Zarei | H01F 37/00 336/61 |

FOREIGN PATENT DOCUMENTS

| | | | | |
|---|---|---|---|---|
| EP | 2966659 | B1 | 1/2020 | |
| WO | WO-0033331 | A1 * | 6/2000 | H01F 27/24 |

* cited by examiner

*Primary Examiner* — Tuyen T Nguyen

(74) *Attorney, Agent, or Firm* — David B. Kelley; Brooks Kushman P.C.

(57) ABSTRACT

A closed ferromagnetic housing has a pair of access ports and a center ferromagnetic post extending from and between opposite ends thereof. At least one conductor, contained within and completely surrounded by the closed ferromagnetic housing, is wound around the center ferromagnetic post such that the closed ferromagnetic housing, center ferromagnetic post, and at least one conductor form an inductor in which the ferromagnetic housing and the center ferromagnetic post define a core of the inductor and the at least one conductor defines a coil of the inductor. The access ports are configured to permit flow of coolant into the closed ferromagnetic housing and around the center ferromagnetic post to cool the at least one conductor.

11 Claims, 3 Drawing Sheets

COMPACT POWER INDUCTOR

TECHNICAL FIELD

The present disclosure relates to power inductor technology that may be used in electric motor vehicles.

BACKGROUND

Electric vehicles—vehicles that use a traction motor drive—typically contain a voltage converter between their battery and motor. Power inductors, which are normally comprised of a conductive coil wound around a magnetic core, are devices inside these voltage converters.

SUMMARY

A power system includes a closed ferromagnetic housing having a pair of access ports and a center ferromagnetic post extending from and between opposite ends thereof, and at least one conductor, contained within and completely surrounded by the closed ferromagnetic housing, wound around the center ferromagnetic post such that the closed ferromagnetic housing, center ferromagnetic post, and at least one conductor form an inductor in which the ferromagnetic housing and the center ferromagnetic post define a core of the inductor and the at least one conductor defines a coil of the inductor. The access ports are configured to permit flow of coolant into the closed ferromagnetic housing and around the center ferromagnetic post to cool the at least one conductor.

An inductor includes a hollow cuboid core having a center post extending from and between opposite sides thereof, and a coil wound around the center post such that the coil is contained within and completely surrounded by the hollow cuboid core. At least one side of the hollow cuboid core defines at least one access port configured to permit flow of coolant into the hollow cuboid core.

A power component includes an inductor including a ferromagnetic container and a coil disposed therein. The ferromagnetic container defines access ports configured to permit flow of coolant into and out of the ferromagnetic container, and around the coil.

DETAILED DESCRIPTION

Figure 1:
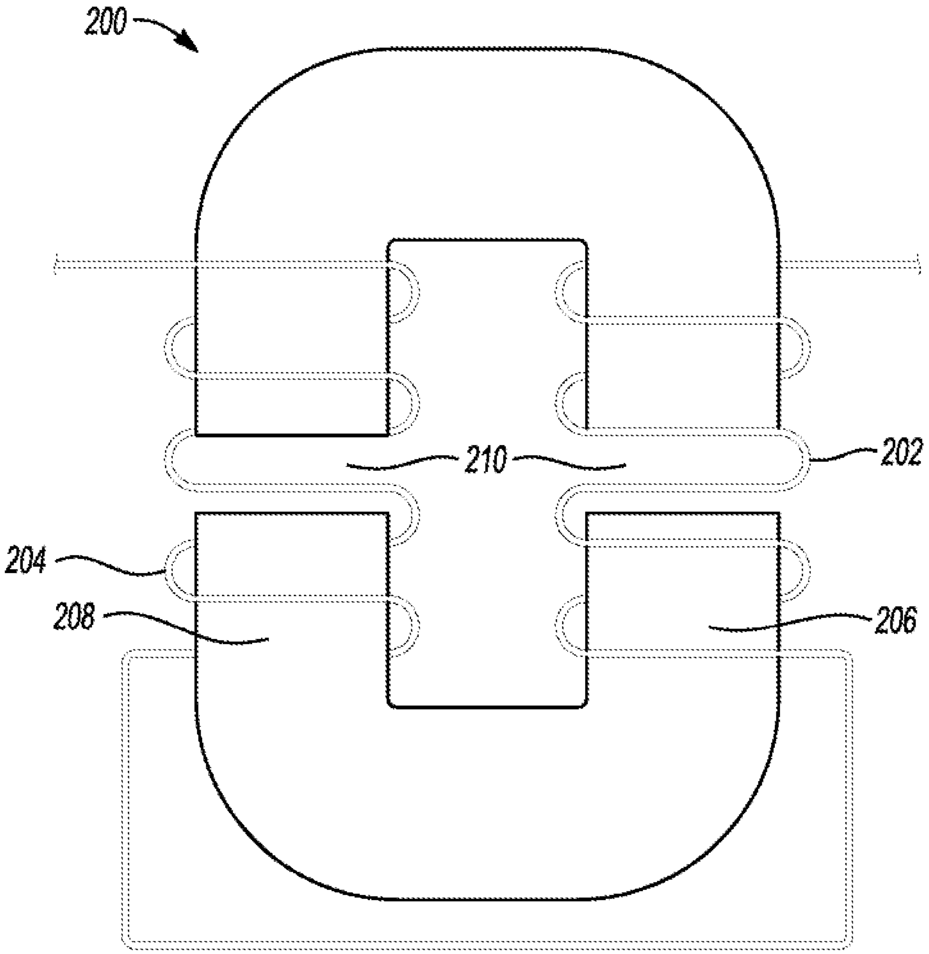
FIG. 1 is a conventional U-type power inductor.

The disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Vehicles that use a traction motor drive (electric machine or electric motor) for propulsion are referred to as electric vehicles (EV). There are three main classes of electric vehicles. These three classes, which are defined by the extent of their electricity consumption, are namely: Battery Electric Vehicles (BEV), Hybrid Electric Vehicles (HEV), and Plug-In Hybrid Electric Vehicles (PHEV). Battery electric vehicles generally use an external electrical grid to recharge their internal battery and power their electric motors. Hybrid electric vehicles use a main internal combustion engine and a secondary supplemental battery to power their motors. Plug-in hybrid electric vehicles, in contrast to hybrid electric vehicles, use a main large capacity battery and a secondary internal combustion engine to power their motors. Some plug-in hybrid electric vehicles can also run solely on their internal combustion engine without engaging the motors.

Electric vehicles typically include a voltage converter (DC-DC converter) between the battery and the motor. Electric vehicles that entertain AC electrical current typically also include an inverter. Voltage converters may increase (boost) or decrease (buck) the voltage potential for enhancing performance of a traction motor drive. Voltage converters are normally comprised of a power inductor (reactor), diodes, and switches. The power inductor, which may be comprised of a conductive coil wounded around a magnetic core, is a device of interest inside the voltage converter. Indeed, a voltage converter's size and performance may depend heavily on the inductor structure and the required cooling system. Cooling systems may be needed to dissipate the heat that is generated by the passage of electrical current through the coil.

Depending on the power requirement and application, shape, size, and material used in inductors may vary. U-type power inductors are commonly used in voltage converters applied to electric vehicles. This design may flexibly adjust the winding window of the core and best utilize the core material. This design, however, like other shapes and designs, may have its own drawbacks.

FIG. 1 shows a U-type power inductor structure 200. While, two coils 202, 204 may be separately located on two core legs 206, 208, copper utilization may be low. Additionally, with a large air gap 210, the low coupling coefficient of the two coils 202, 204 may lead to lower inductance. Inductance is defined as the ratio of magnetic flux to current and generally refers to an inductor's ability to store energy in a magnetic field generated by the passage of electrical current through the coil. Therefore, to increase the linking of the magnetic field between the different turns of the coil, high turn number and more copper for the winding may be required to achieve the desired inductance. High turn number and more copper of the winding, however, could cause the inductor to be bulkier and more prone to energy lose.

In addition, cooling performance may significantly affect the inductor size. Inductor cooling is commonly accomplished by mounting the inductor on a heat sink plate of an inverter system controller's aluminum housing, splashing fluid that acts as coolant onto the surface of the inductor, or flowing coolant in a conduit adjacent to the inductor. Accordingly, inductors may be cooled either actively or passively from the outside or the exterior of the inductor assembly. In addition to occupying a large space, these cooling mechanisms may not be necessarily efficient in cooling the hottest area of the inductor which may be located inside of the inductor.

To resolve the above-mentioned potential issues of size (large space/volume requirement) and effectiveness (inefficiencies associated with external cooling of the inductor), a compact power inductor is proposed. More particularly, the present disclosure proposes a compact power inductor by improving inductor structure and cooling. Improving inductor structure and cooling each may contribute to achieving a compact inductor with a smaller size and lower energy loss.

A power system may comprise an inductor. The proposed inductor may integrate a core (a "hollow cuboid core" or a "ferromagnetic container"), windings (coil or conductors), and a cooling system together. The windings may surround an inner core (inner leg of the core) and may be encased by an outer core (outer leg of the core) to form a closed magnetic path. The inner core and the outer core may combine to form a closed housing encapsulating the windings. The closed housing may have a plurality of access ports to facilitate the flow of a coolant inside the closed housing to directly contact the windings and remove heat.

In other words, a power system comprising a closed ferromagnetic housing having a pair of access ports is proposed. The closed ferromagnetic housing may have a center ferromagnetic post extending from and between opposite ends thereof. At least one conductor may be contained within and surrounded by the closed ferromagnetic housing. The at least one conductor may be wound around the center ferromagnetic post such that the closed ferromagnetic housing, center ferromagnetic post, and at least one conductor form an inductor in which the ferromagnetic housing and the center ferromagnetic post define a core of the inductor and the at least one conductor defines a coil of the inductor, wherein the access ports are configured to permit flow of coolant into the closed ferromagnetic housing and around the center ferromagnetic post to cool the at least one conductor.

A closed magnetic path may allow the inductor to best utilize copper and the flux generated from each side of the windings. Additionally, the coupling coefficient of the winding may be unity. In other words, the proposed inductor may achieve a larger inductance with less turn number and less copper in comparison with the existing inductors such as that shown in FIG. 1. Yet another advantage of the proposed inductor may be its lower copper AC loss in comparison with existing inductors such as that shown in FIG. 1.

Figure 2:
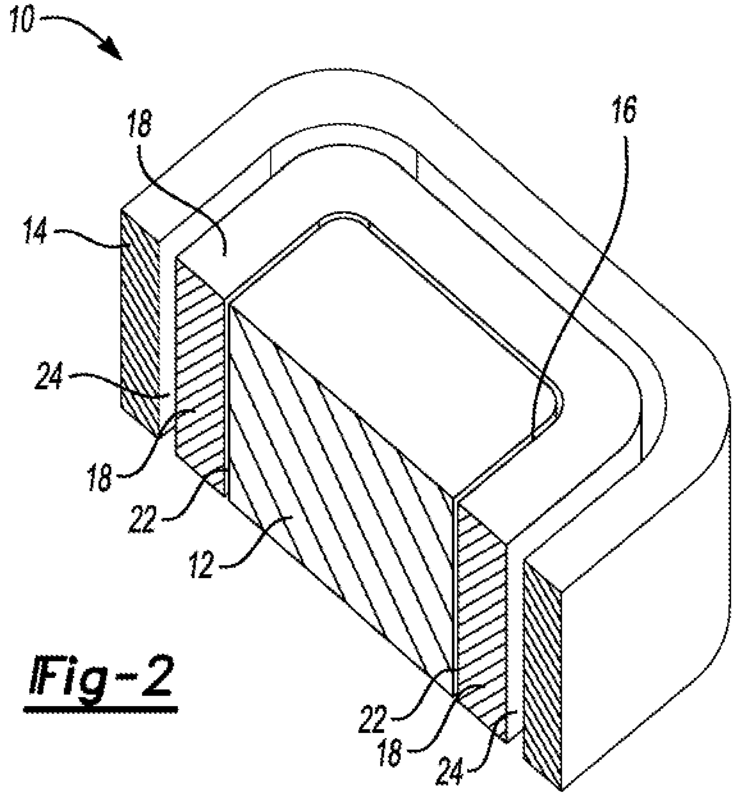
FIG. 2 is cross-sectional view of a proposed power inductor.

Referring to FIG. 2, an inductor assembly 10 is shown. In some embodiments, the inductor assembly 10 may comprise an inner core 12 (a center ferromagnetic post) and an outer core 14 (a closed ferromagnetic housing) defining a conduit 16 to accommodate winding 18 and a coolant. In one embodiment, winding 18 occupying conduit 16 may surround the inner core 12 defining a first cavity 22 therebetween (inner cavity) for accommodating the flow of the coolant. In another embodiment, winding 18 surrounding the inner core 12 occupying conduit 16 may be spaced apart from the outer core 14 defining a second cavity 24 therebetween (outer cavity) for accommodating the flow of the coolant. In yet another embodiment, winding 18 occupying conduit 16 may both surround the inner core 12 defining the first cavity 22 therebetween (inner cavity) and be spaced apart from the outer core 14 defining the second cavity 24 therebetween (outer cavity) for simultaneous accommodation of the flow of the coolant. Since this embodiment has no fringing flux, there is no fringing flux induced copper AC loss.

In some embodiments, the inductor assembly 10 may further comprise one or more gapped portions. In some embodiments, the gapped portions are filled with non-ferromagnetic material. In one embodiment, the gapped portion is filled with ceramics. The gapped portions may be used to avoid core saturation while handling large loads of electrical current. Gapped portions are typically used in conjunction with high permeability cores to extend current capabilities. Accordingly, in one embodiment of this disclosure, one or more gapped portions filled with non-ferromagnetic material may be used in conjunction with a high permeability core.

Figure 3:
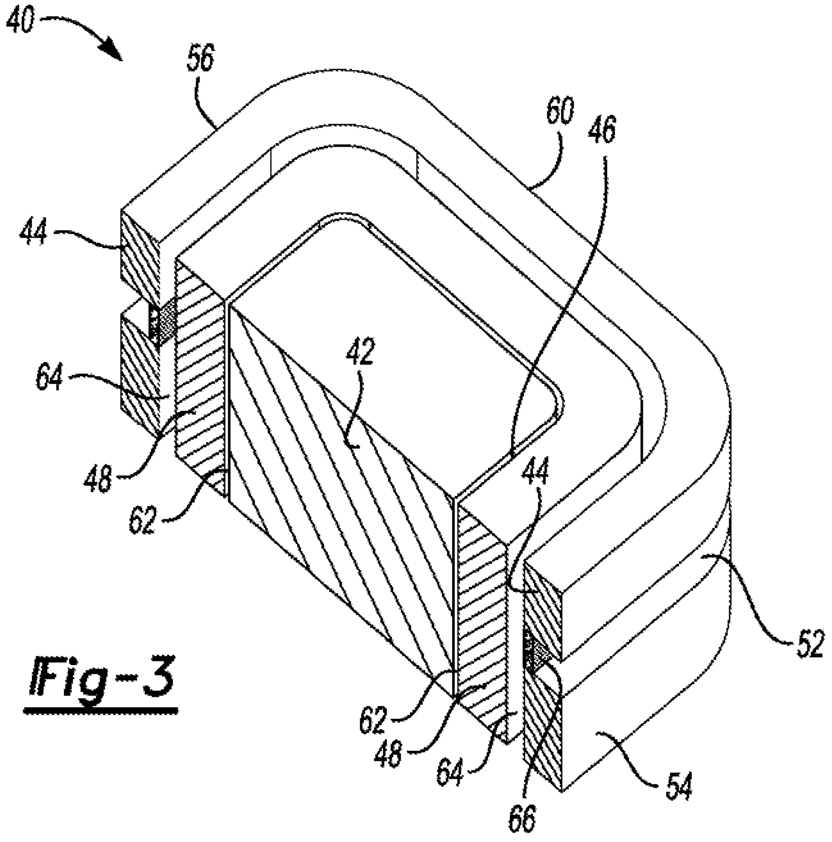
FIG. 3 is a cross-sectional view of a proposed power inductor having at least one airgap.

Referring to FIG. 3, an inductor assembly 40 is proposed. In some embodiments, the inductor assembly 40 may comprise an inner core 42 (a center ferromagnetic post) and an outer core 44 (a closed ferromagnetic housing) defining a conduit 46 to accommodate at least one winding 48 and a coolant wherein the outer core 44 accommodates one or more gapped portions 52 filled with non-ferromagnetic material 66. While this embodiment may have fringing flux, flow of the coolant between the gapped portions 52 and the at least one winding 48 may cause the winding 48 to be far enough from the fringing flux to reduce and/or eliminate copper AC loss. In some embodiments, like the exemplary embodiment of FIG. 3, where the core is substantially cuboid, the gapped portion 52 may occupy a first side wall 54, a second side wall (not shown), a third side wall 56 and a fourth side wall 60 substantially wrapping around the outer core 44. In some embodiments, the gapped portions 52 may only partially occupy the outer core 44. In yet other embodiments, the gapped portions 52 may occupy only two adjacent side walls or two opposing side walls.

In one embodiment, the winding 48 occupying conduit 46 may surround the inner core 42 defining a first cavity 62 (or a first gap) therebetween (inner cavity) for accommodating the low of the coolant. In another embodiment, the winding 48 surrounding the inner core 42 occupying the conduit 46 may be spaced apart from the outer core 44 defining a second cavity (or a second gap) 64 therebetween (outer cavity) for accommodating the flow of the coolant. In yet another embodiment, the winding 48 occupying the conduit 46 may both surround the inner core 42 defining the first cavity 62 therebetween (inner cavity) and be spaced apart from the outer core 44 defining the second cavity 64 therebetween (outer cavity).

Figure 4:
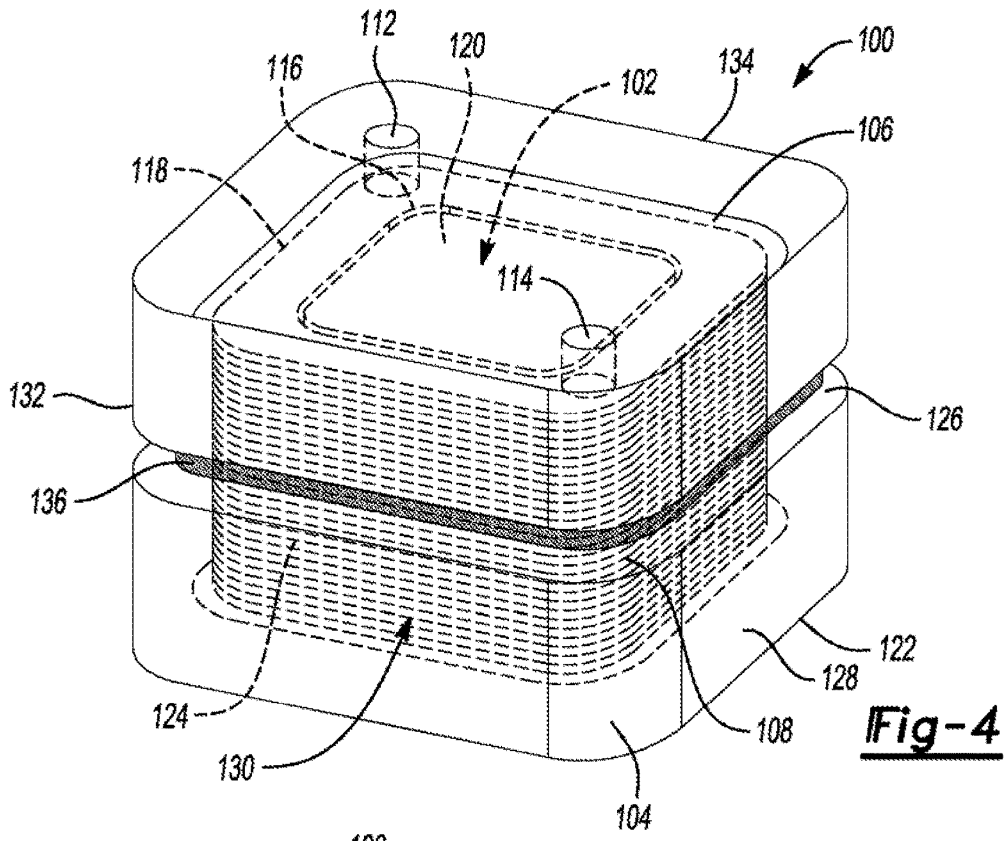
FIG. 4 is a perspective view of a proposed power inductor.
Figure 5:
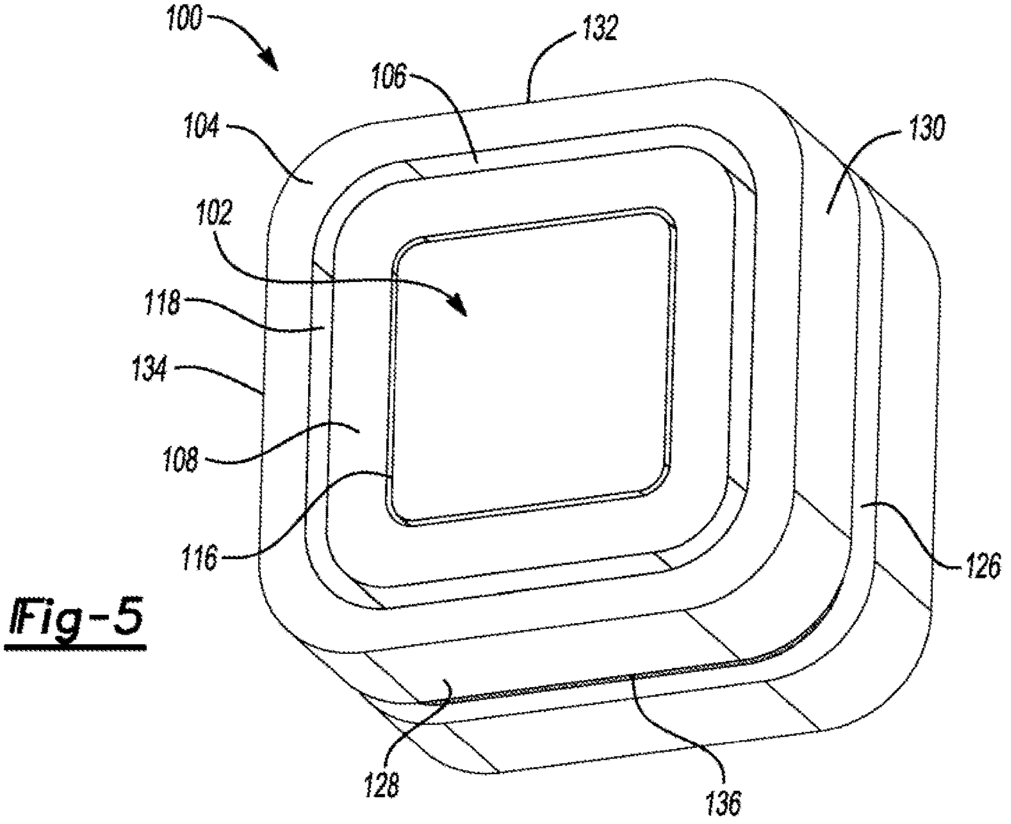
FIG. 5 is a perspective view of a proposed power inductor.

FIGS. 4 and 5 show a proposed inductor. In this embodiment, the proposed inductor has a cuboid shape and has no more than six sides. In this embodiment, an inductor assembly 100 is shown. The inductor assembly 100 may comprise an inner core 102 and an outer core 104 defining a conduit 106 to accommodate winding 108 and a coolant. The outer core 104 may further be comprised of a coolant inlet 112 and a coolant outlet 114 (not shown in FIG. 5). Conduit 106 may further have a first cavity 116 and/or a second cavity 118. The first cavity 116 may be defined by the space between the winding 108 and inner core 102. The second cavity 118 may be defined by the space between the winding 108 and outer core 104. Depending on the heat removal needs of a particular application, the coolant, fed to the inductor assembly 100 through the first coolant inlet 112, may flow through either the first cavity 116, the second cavity 118, or both before exiting the inductor assembly 100.

Put another way, FIGS. 4 and 5 demonstrate a power system comprising a closed ferromagnetic housing 104 having a pair of access ports 112, 114 and a center ferromagnetic post 102 extending from and between opposite ends thereof. In this embodiment, the closed ferromagnetic housing 104 has a cuboid shape and has no more than six sides. The power system may further comprise at least one conductor 108, contained within and completely surrounded by the closed ferromagnetic housing 104, wound around the center ferromagnetic post 102 such that the closed ferromagnetic housing 104, center ferromagnetic post 102, and at least one conductor 108 form an inductor 100 in which the ferromagnetic housing 104 and the center ferromagnetic post 102 define a core of the inductor 100 and the at least one conductor 108 defines a coil of the inductor 100. In some embodiments, the access ports 112, 114 may be configured to permit flow of a coolant into the closed ferromagnetic housing 104 and around the center ferromagnetic post 102 to cool the at least one conductor 108.

In some embodiments, the coolant inlet 112 and the coolant outlet 114 (collectively "access ports") are both situated on a top wall 120 of the inductor assembly 100. It is to be understood, however, that the present disclosure is not limited to such an embodiment. Rather, the first coolant inlet 112 and the second coolant outlet 114 may both be situated on a bottom wall 122 or any of a first side wall 128, second side wall 130, third side wall 132, or fourth side wall 134 (collectively "side walls 124"). Similarly, depending on orientation and application needs, only one of the coolant inlet 112 or coolant outlet 114 may be situated on the top wall 120, bottom wall 122, or side walls 124 and the other of the coolant inlet 112 or coolant outlet 114 may be situated in any of the top wall 120, bottom wall 122, or side walls 124. In other words, the access ports 112, 114 (or more) may be disposed on a same end (wall) or a different ends (walls) of the inductor assembly 100.

Spatially relative terms, such as "top," "bottom," "inner," "outer," "beneath," "below," "lower." "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Both a first cavity 116 and second cavity 118 are shown. It is to be understood, however, that the present disclosure is not limited to such an embodiment. Rather, the inductor assembly 100 may comprise only the first cavity 116, the second cavity 118, or both. Moreover, the illustrated embodiments only depict inductor assemblies with a substantially cuboid shape. It is to be understood, however, that the present disclosure is not limited to such an embodiment. Put another way, in this embodiment, both the first gap 116 and a second gap 118 are shown. The first gap 116 may be defined by the space between the center ferromagnetic post 102 (center post) and the at least one conductor 108 (coil). The second gap 118 may be defined by the space between the closed ferromagnetic housing 104 (hollow cuboid core) and the at least one conductor 108 (coil).

The inductor assembly 100 may further comprise one or more gapped portions 126. In some embodiments, the gapped portions 126 may be partially filled with a non-ferromagnetic material 136. In some embodiments, the gapped portion 126 may occupy a first side wall 128 (or a first end), a second side wall 130, a third side wall 132, a fourth side wall 134, or any combination thereof. In some embodiments, like the embodiment shown in FIGS. 4 and 5, the gapped portions 126 may be substantially wrapped around the outer core 104.

In yet other embodiments, one or more fins (not shown) may be added (coupled to the winding) in the first cavity, second cavity, or both between the windings and the inner core and/or outer core to increase the surface area in contact with the coolant and increase heat removal efficiency. The cooling efficiency derived from the present disclosure, with or without fins, may help reduce the inductor size by resolving the space issues associated with using an external cooling mechanism. Additionally, in comparison with conventional inductor assemblies, the inductor proposed here, with or without fins, may have low (or no) fringing flux and less copper requirements.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system comprising:

a closed ferromagnetic housing having a pair of fluid access ports and a center ferromagnetic post extending from and between opposite ends thereof; and at least one conductor, contained within and completely surrounded by the closed ferromagnetic housing, wound around the center ferromagnetic post such that the closed ferromagnetic housing, center ferromagnetic post, and at least one conductor form an inductor in which the ferromagnetic housing and the center ferromagnetic post define a core of the inductor and the at least one conductor defines a coil of the inductor.

2. The power system of claim 1, wherein the closed ferromagnetic housing further defines a wall around the center ferromagnetic post and wherein the wall has a gapped portion filled with a non-ferromagnetic material separating upper and lower sections of the wall.

3. The power system of claim 1, wherein the closed ferromagnetic housing has no more than six sides.

4. The power system of claim 1, wherein the closed ferromagnetic housing has a cuboid shape.

5. The power system of claim 1, wherein the fluid access ports are disposed on a same end of the closed ferromagnetic housing.

6. The power system of claim 1, wherein the center ferromagnetic post and the at least one conductor define a gap therebetween.

7. The power system of claim 1, wherein the closed ferromagnetic housing and the at least one conductor define a gap therebetween.

8. A power component comprising:

an inductor including a ferromagnetic container and a coil disposed therein, wherein the ferromagnetic container defines a wall around the coil and access ports configured to permit flow of coolant into and out of the ferromagnetic container, and around the coil, and wherein the wall has a gapped portion around a perimeter thereof filled with a non-ferromagnetic material separating upper and lower sections of the wall.

9. The power component of claim 8, wherein the ferromagnetic container has a center post extending from and between opposite ends thereof.

10. The power component of claim 9, wherein the coil is wound around the center post.

11. The power component of claim 8, wherein the ferromagnetic container has a cuboid shape.

* * * * *